Jan. 26, 1932.   N. CAROLIN   1,842,656
AEROPLANE
Original Filed May 29, 1930    5 Sheets-Sheet 3

Inventor

Norbert Carolin

By Clarence A. O'Brien
Attorney

Jan. 26, 1932.  N. CAROLIN  1,842,656
AEROPLANE
Original Filed May 29, 1930   5 Sheets-Sheet 4

Inventor

*Norbert Carolin*

By *Clarence A. O'Brien*
Attorney

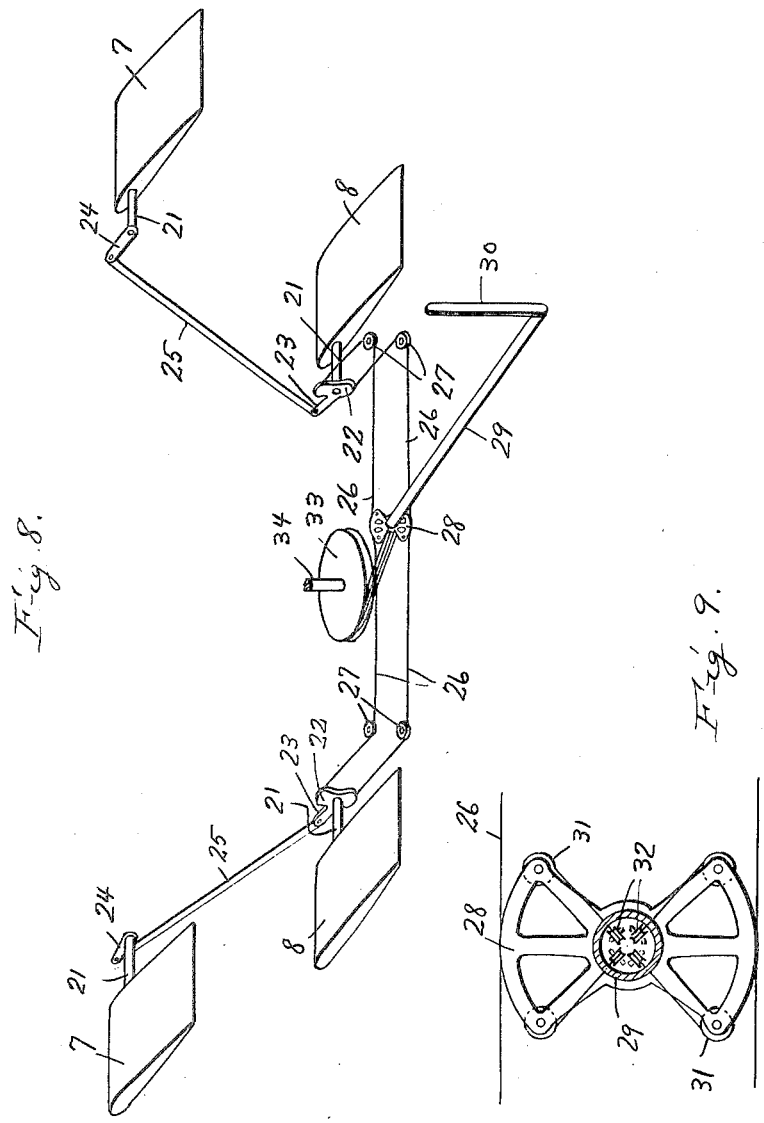

Patented Jan. 26, 1932

1,842,656

UNITED STATES PATENT OFFICE

NORBERT CAROLIN, OF LOS ANGELES, CALIFORNIA

AEROPLANE

Application filed May 29, 1930, Serial No. 457,274. Renewed April 13, 1931.

This invention relates to new and useful improvements in airplanes of the general type illustrated and described in United States Patent No. 1,274,986 issued to me on August 6, 1918, and upon which the present invention constitutes an improvement.

An important object of the invention is to provide, in a manner as hereinafter set forth, an airplane of the aforementioned character having wings embodying a stationary section and a movable or extensible section together with means for actuating said movable sections in a manner to shift the same to extended or retracted position simultaneously.

Another important feature of the invention resides in the provision of an airplane having wings embodying a stationary section and a movable section, said sections being provided with air slots which are open when the movable sections are in extended position and which are closed when said movable sections are in retracted position, the slots in the stationary sections being closed by the movable sections and the slots in the movable sections being closed by the stationary sections.

Another important feature of the invention resides in the provision of ailerons mounted on the opposite ends of the wings together with control or actuating means therefor operatively connected with the movable wing section operating means in a manner to permit movement of the ailerons with the movable wing sections to extended position.

A still further important feature of the invention resides in the provision of novel means for slidably supporting the movable wing sections on the stationary wing sections and wherein the movable wing sections materially strengthens the stationary wing sections when in retracted or inoperative position.

Other objects of the invention are to provide an airplane of the character described which will be comparatively simple in construction, strong, durable, efficient in operation and which may be manufactured at comparatively low cost.

All of the foregoing and still further objects and advantages of the invention may become apparent from a study of the following specification, taken in connection with the accompanying drawings wherein like characters of reference designate corresponding parts throughout the several views, and wherein:—

Figure 8 is a diagrammatic view showing the operating mechanism for the ailerons.

Figure 9 is a detail view showing the double quadrant forming an essential of the ailerons control mechanism.

Figure 1:
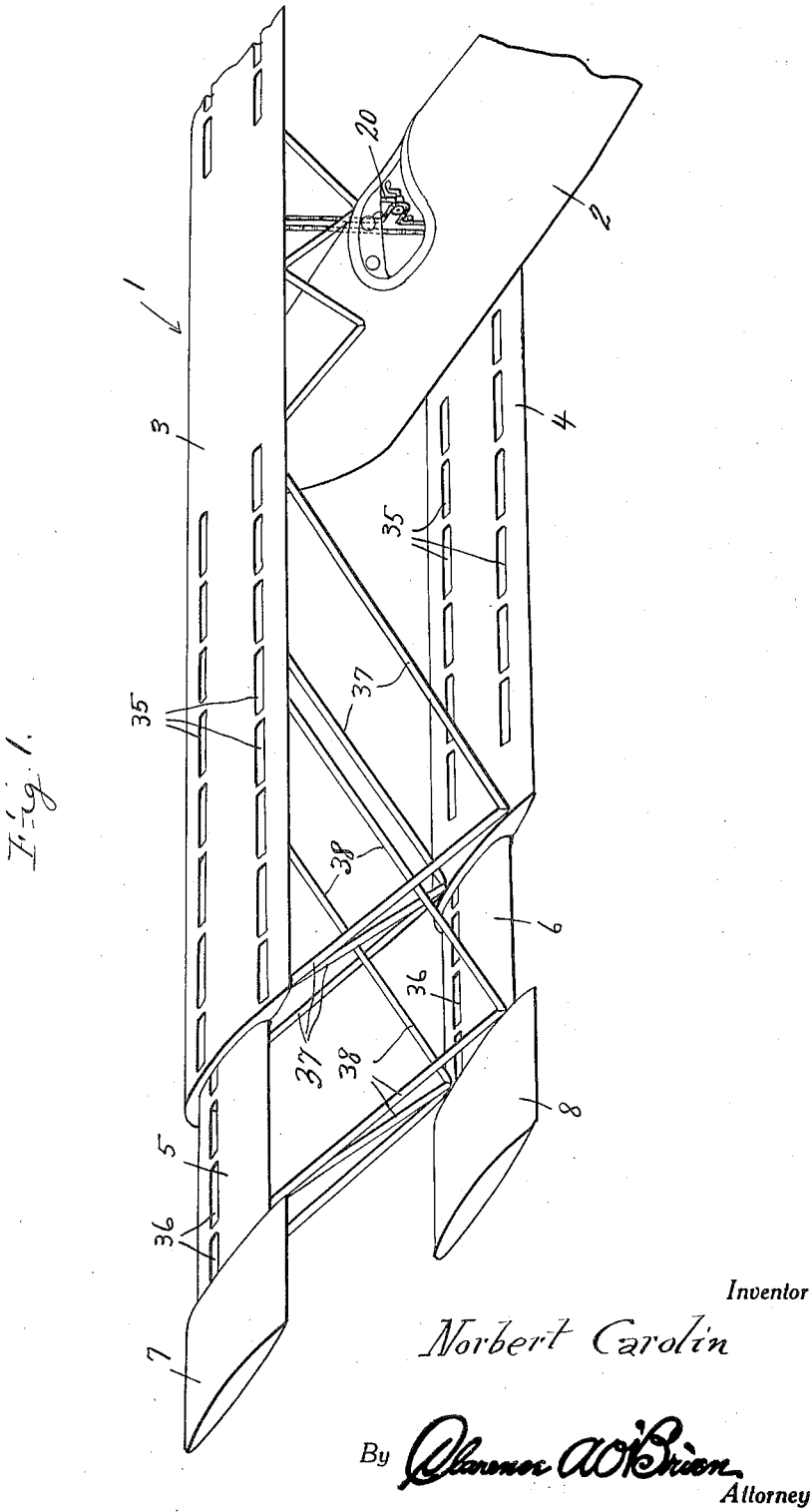
Figure 1 is a view in rear top perspective showing one side of an upper and lower airplane wing constructed in accordance with this invention, the movable wing section being shown partially extended.

Referring to the drawings in detail, it will be seen that the airplane is designated generally by the reference numeral 1 and comprises a fuselage 2. The reference numerals 3 and 4 designate stationary upper and lower wing sections, respectively, in which are slidably mounted the movable wing sections 5 and 6, respectively, upon which the upper and lower ailerons 7 and 8 are operatively mounted.

As will be seen the ailerons 7 and 8 are disposed on the free ends of the movable wing sections 5 and 6.

Figure 2:
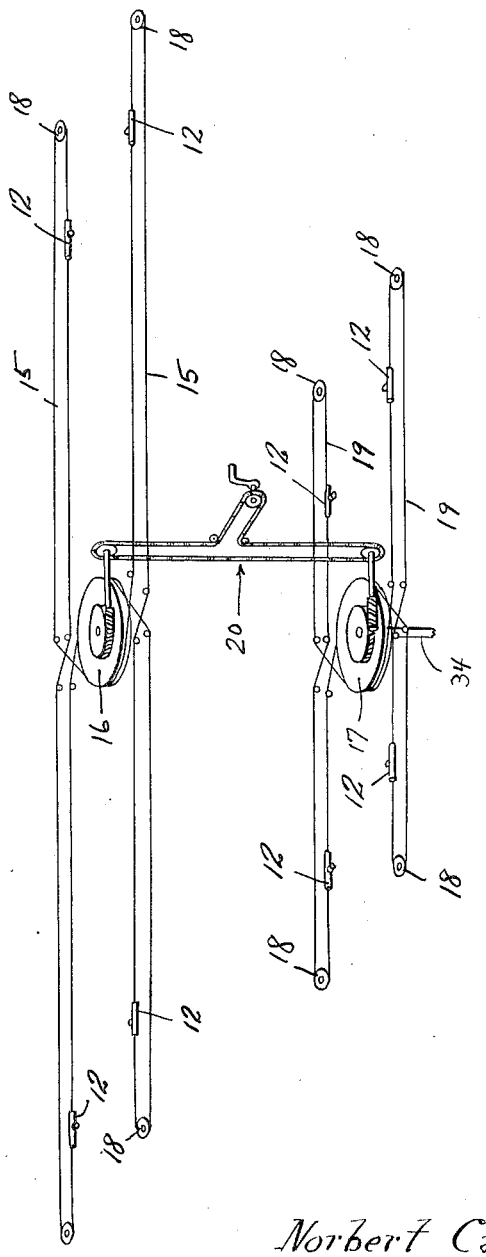
Figure 2 is a diagrammatic view showing the arrangement and actuating means for the operating cables which shift the movable wing section.
Figure 4:
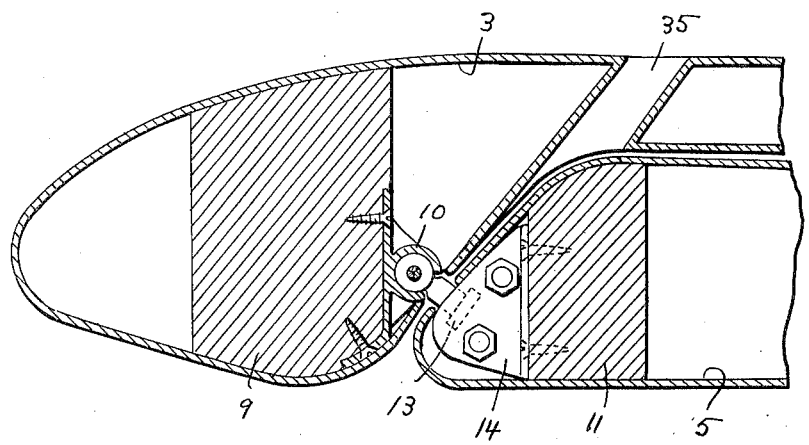
Figure 4 is a vertical cross sectional view on an enlarged scale showing the means for slidably mounting the front edge of one of the movable sections on the stationary wing section.
Figure 5:
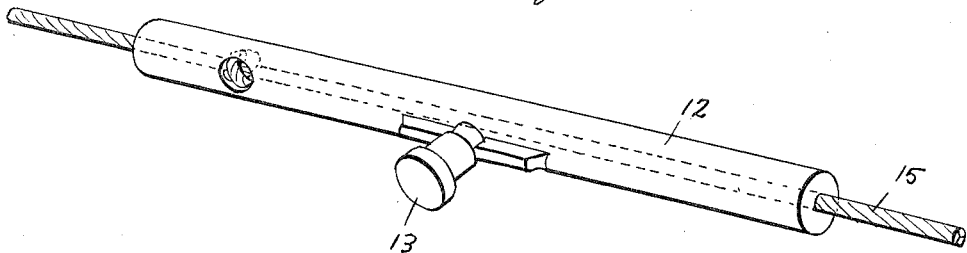
Figure 5 is a detail view in perspective on an enlarged scale showing one of the slidable keys to which the actuating cables are connected and which keys are connected to the movable wing section for the purpose of shifting the same.
Figure 6:
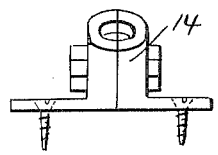
Figure 6 is a detail view in elevation showing one of the sockets with which the keys are connected, for coupling the stationary and movable wing sections together for sliding movement.

Disposed longitudinally in the front and rear portions of the stationary wing sections 3 and 4 are the spars 9 upon the inner sides of each of which is rigidly secured an elongated channel member 10 (see Figure 4). Spars 11 are provided in the front and rear portion of each of the movable wing sections 5 and 6. Mounted for sliding movement in each of the channel members 10 is an elongated cylindrical bar 12 having formed integrally thereon a head 13 which is swivelly mounted in a socket member 14 rigidly mounted on the adjacent base of the spars 11. Cables 15 are connected to the cylindrical bar 12 in a manner to shift in either direction in the channel members 10 and the said cables are trained around and secured to a pair of windlasses 16 and 17 and actuated thereby. The cables are trained over pulleys 18 mounted in the outer end portions of the upper and lower stationary wing sections at the front and rear thereof in a manner to shift all of the bars 12 outwardly and inwardly simultaneously. It may be well to here state that the actuating cable on the movable upper wing section is the one designated by the reference character 15, and, as seen in Figure 2, the cable for the movable lower wing section is designated by the reference numeral 19. Suitable chain and gear mechanism designated generally by the reference numeral 20 is operatively connected to the pulleys 16 and 17 for manually operating the same simultaneously. Channel members similar to the members 10 are secured to spars 11. Also, bars, heads and sockets similar to the elements 12, 13 and 14 are mounted on the outer ends of the spars 9. No cables are attached to these last named bars and same slide in their respective channel members in a manner similar to that described for the elements 10 and 12.

The ailerons 7 and 8 are mounted on the shafts 21 journaled for rotation in the free ends of the movable wing sections 5 and 6 and having fixed on their inner ends means for actuating the same. The supporting shaft for each of the lower ailerons have fixed thereon a cross head 22 from which an arm 23 extends and said arm 23 is operatively connected to an arm 24 of the shaft of the upper ailerons through the medium of the links 25. Cables 26 are provided for each of the ailerons and said cables are connected to the upper and lower ends of the cross heads 22, and extends therefrom over pulleys 27 and then across the double quadrant 28 mounted on an actuating shaft 29 having an operating lever 30 fixed on one end thereof. A cable 26 extends in opposite direction across the double quadrant 28 and passes over the pulleys 31 thereon and then over the pulleys 32 in the hub of the quadrant and are secured to the grooved windlass 33. The windlass 33 is fixed on a shaft 34 which has its upper end fixed in the pulley 17 (see Figure 2).

The reference numeral 35 designates air slots in the upper and lower stationary wind sections, said slots being provided adjacent the entering and trailing edges thereof. Air slots 36 are provided in the shiftable or movable wing sections 5 and 6.

Figure 3:
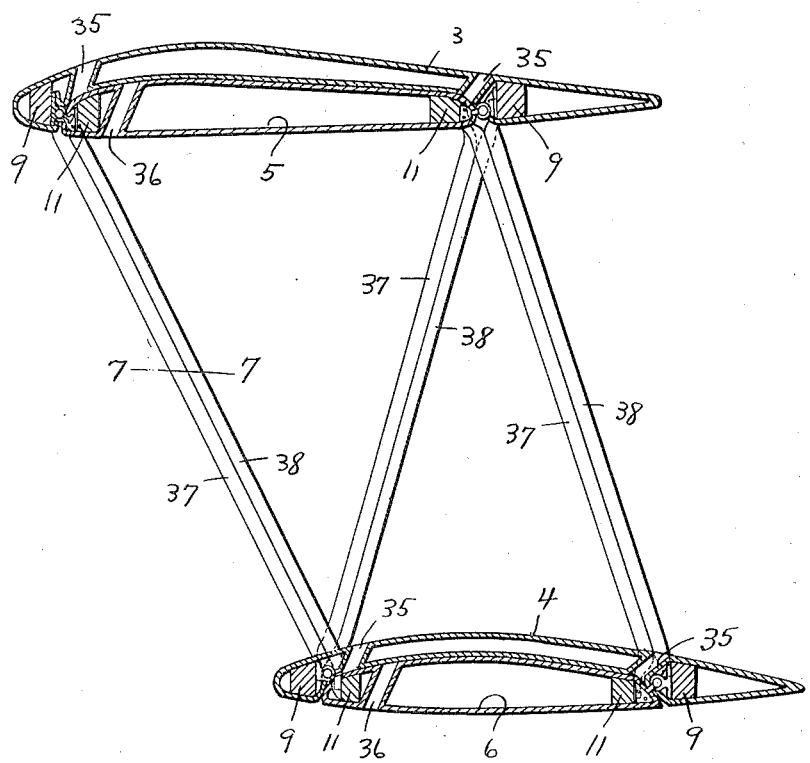
Figure 3 is a longitudinal sectional view through the upper and lower wings with the movable section in retracted position.
Figure 7:
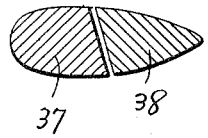
Figure 7 is a horizontal cross sectional view taken substantially on the line 7—7 of Figure 3 showing the disposition of the struts of the stationary and movable wing sections when said movable wing sections are in retracted position.

As illustrated to advantage in Figure 3 of the drawings, the air slots 35 in the stationary wing sections are closed by the movable wing sections when the same are in retracted position and the air slots 36 in said movable wing sections are closed by the stationary wing sections when said movable wing sections are in retracted position. Suitable struts 37 and 38 extend between the upper and lower stationary wing section and the upper and lower movable wing sections respectively, and said struts 37 and 38 are substantially in the position illustrated in Figure 7 of the drawings when the movable wing sections are in retracted position. This provides a trailing effect and materially reduces wind resistance which would otherwise be had.

In operation, the movable wing sections 5 and 6 are simultaneously shifted to operative or inoperative position on the opposite ends of the upper and lower wings 3 and 4 by actuating the pulleys 16 and 17 through the medium of the manually operable mechanism 20. As will be seen, the arrangement of the cables 15 and 19 over pulleys mounted in the upper and lower stationary wing sections is such that the bars 12 will all be moved either outwardly or inwardly simultaneously. The bars 12 being connected to the shiftable or movable wing sections 5 and 6 through the medium of the heads 13 disposed in the socket members 14 will move said movable wing sections 5 and 6 to extended or retracted position, as will be apparent. When the pulley 17 is actuated, the windlass 33 is also actuated through the medium of the shaft 34 in a manner to pay out the cables 26 when the movable wing sections are being shifted to extended position in order to permit the ailerons 7 and 8 to move therewith, said ailerons being mounted on said movable wing sections. The ailerons are actuated by rocking the double quadrant 28 through the medium of the shaft 29 and the hand lever 30. When the movable wing sections are shifted to retracted position, the direction of rotation of the windlass 33 is reversed and the cables 26 are wound thereon and in this manner the cables 26 are maintained taut at all times thus permitting the operation of the ailerons when the movable wing sections are in extended, retracted, or intermediate position. The diameter of the grooves in the windlass 33 are such that the upper cables 26 unwind faster than the lower cables 26. Hence in the extended position, the ailerons have a smaller angle of incidence than the wings.

If desired, the rear portions of the stationary wing sections may be hinged to form the customary wing flaps.

It is believed that the many advantages of an airplane constructed in accordance with this invention will be readily understood, and although the preferred embodiment of the invention is as illustrated and described, it is to be understood that changes in the details of construction may be had which will fall within the scope of the invention as claimed.

What is claimed is:—

1. In an airplane, a wing formed of telescopic sections, means for holding one section against movement, means for moving the other section longitudinally to adjust the length of the wing, each section having a longitudinally extending row of slots therein, the row of slots in one section being located to one side of the row of the other section whereby the slots in each section will be closed by the other section when the movable section is in full retracted position, the slots being opened when the movable section is projected, the number of open slots varying in accordance with the extent of projection of the movable section.

2. In an airplane, a wing formed of a stationary section and a longitudinally movable section, the stationary section having a longitudinally extending recess in its under part for receiving the movable section, guideways carried by the stationary section and located adjacent the sides of the recess, a member slidably arranged in each guideway, brackets carried by the sides of the movable section, projections connected with the sliding members and swivelled in the brackets, cables connected with the sliding members, and means for operating the cables to move the sliding members in the guideways.

3. In an airplane, a wing structure therefor comprising a plane formed of an upper section and a lower section, means securing said upper section to the body of said airplane, said upper section having a longitudinally extending recess formed upon its lower side to permit nesting therein of the lower section of said plane, an elongated guideway secured to the front of said recess and having a slot therein extending longitudinally of said upper section, an elongated guideway secured to the rear of said recess and having a slot therein extending longitudinally of said upper section, a pair of keys on said lower section, one of said keys being secured to the front of the lower section and the other secured to the rear of the lower section for cooperative engagement with the guideways and slots, and means for moving said lower section longitudinally relative to said upper section.

4. In an airplane, a wing structure therefor comprising a plane formed of an upper section and a lower section, means securing said upper section to the body of said airplane, said upper section having a longitudinally extending recess formed upon its lower side to permit nesting therein of the lower section of said plane, an elongated guideway secured to the front of said recess and having a slot therein extending longitudinally of said upper section, an elongated guideway secured to the front of said lower section and having a slot therein extending longitudinally of said lower section and facing the front of said recess, a pair of keys one secured to said upper section and one to said lower section for insertion in and movement along the respective guideways in the opposite sections.

5. In an airplane construction, a wing structure therefor comprising an upper section and a lower section, nested relative to each other, means mounting said lower section for longitudinal telescopic movement relative to said upper section whereby the effective area of said wing may be extended or diminished, an aileron connected to the lower section of said wing, control means for said aileron comprising a cable connected thereto and a control quadrant over which said cable passes, means for moving said lower section of said wing relative to said upper section comprising one or more cables, means for winding said cables, winding means for said aileron control cables movable with the winding means for said lower section, and means securing said aileron cables to said last named means, the ratio of movement of said two winding means being such that extension of said wing compensates the increased length of the aileron control cables in a predetermined ratio so that the normal angle of incidence of said aileron diminishes with increase in wing area.

6. In an airplane construction, a wing structure therefor comprising an upper section and a lower section, nested relative to each other, means mounting said lower section for longitudinal telescopic movement relative to said upper section whereby the effective area of said wing may be extended or diminished, an aileron connected to the lower section of said wing, control means for said aileron comprising a cable connected thereto and a control quadrant over which said cable passes, means permitting said cables to pass through said quadrant for passing thereover, winding means secured to said control cables beyond said quadrant, winding means and cables connecting with said lower section to extend or retract said lower section, means connecting said two winding means for synchronous movement whereby extension or contraction of said wing compensates the length of said aileron control cables.

7. In an airplane construction, a fuselage, a wing extending on each side of said fuselage, each of said wings comprising an upper section and a lower section extended relative to each other, means mounting the lower section of each wing for longitudinal telescopic movement relative to the upper section thereof, an aileron connected to each lower section, control cables connected to said aileron and passing over a quadrant in said fuselage to produce differential movement of said aileron when said quadrant is moved, means extending or retracting said lower sections relative to said upper sections, winding means for said aileron control cables connected to said lower section, extending means beyond said quadrant to compensate the length of said aileron control cables in a predetermined ratio to the amount of extension of said lower sections to reduce the normal angle of incidence of said ailerons proportionably to the increase in wing area, the differential relation of said aileron under the influence of said quadrant remaining constant.

8. In an airplane construction, a wing structure therefor comprising an upper section and a lower section, means mounting said lower section for longitudinal movement relative to said upper section, an air slot perforating said upper section, an air slot perforating said lower section, said slots being disaligned with each other so that when said lower section is retracted the slot in the upper section is closed by the lower section and the slot in the lower section is closed by the upper section, and means for moving said lower section relative to said upper section to expose said slots, the exposed area being proportional to the amount of extension of said sections.

9. In an airplane construction, a wing structure therefor comprising an upper section and a lower section, nested relative to each other, means mounting said lower section for longitudinal telescopic movement relative to said upper section whereby the effective area of said wing may be extended or diminished, an aileron connected to the lower section of said wing, means for extending said lower section relative to said upper section, control means for said aileron extensible and retractible with increase or decrease in length of said wing, means interconnecting said aileron control means and said means for extending and retracting said wing for reducing the normal angle of coincidence of said aileron proportionably to the amount of extension of said wing.

In testimony whereof I affix my signature.
NORBERT CAROLIN.